April 30, 1968  J. W. KEMMLER  3,381,067

METHOD OF MAKING A TERRAZZO PLASTIC COMPOSITION PRODUCT

Filed March 9, 1961

INVENTOR.
JAMES W. KEMMLER
BY
ATTORNEY

United States Patent Office 3,381,067
Patented Apr. 30, 1968

3,381,067
METHOD OF MAKING A TERRAZZO PLASTIC COMPOSITION PRODUCT
James W. Kemmler, Needham, Mass., assignor to Congoleum-Nairn Inc., Kearny, N.J., a corporation of New York
Continuation-in-part of application Ser. No. 707,037, Jan. 3, 1958. This application Mar. 9, 1961, Ser. No. 94,491
7 Claims. (Cl. 264—73)

This application is a continuation-in-part of my copending application, Ser. No. 707,037, filed Jan. 3, 1958, entitled "Terrazzo Plastic Composition Product," now abandoned.

This invention relates to plastic composition sheets and particularly to such sheets which are wear resistant and decorative and adapted for use as smooth surface coverings for floors, walls, articles of furniture and the like.

Plastic composition sheets have been produced having complex non-directional designs by molding operations. One such procedure involves covering a felt sheet with colored pieces of plastic composition in a predetermined pattern by use of a series of stencils. In this procedure, each prominent area of different color has a separate stencil. After the felt has been uniformly covered with grranules of plastic composition, it is subjected to heat and pressure in a press to mold the plastic granules together to form a smooth sheet. The cost of producing such complex designs is high because of the stepwise manner by which it must be carried out and the necessity of separately handling each color and the individual stencils.

A similar product is produced by the method disclosed in U.S. Patents No. 1,975,515, issued Oct. 2, 1934 and No. 2,113,158, issued Apr. 5, 1938, both to Frederick G. Mayer. In accordance with this method, different colored chips of plastic composition are randomly placed on a backing and molded in a press. This procedure produces a product which is similar to stone terrazzo, but lacks the matrix or mortar which surrounds each stone chip in the natural product.

An object of the invention is to produce a flexible, smooth surface floor covering of plastic composition closely simulating stone terrazzo. Another object of the invention is to produce such a floor covering in a simple and economical manner capable of adaptation to commercial processing. A further object is to provide a process for producing a plastic composition sheet having unique structural characteristics, long-wearing attributes and a distinctive and attractive decorative appearance. Other objects and the advantages of the invention will appear hereinafter.

In accordance with the invention, a flexible smooth surface covering is produced by coating granules of thermoplastic composition with fine particles of thermoplastic resin and pressing the coated granules into a smooth, uniform sheet by the application of heat and pressure. Each granule which makes up the pressed product is surrounded by an area formed by the particles of resin. By selection of pigments, it is possible to produce a product which is substantially identical to stone terrazzo as well as a product having unique color characteristics. The coating on the granules gives the product high resistance to wear.

The coating of fine particles of resin on the granules of thermoplastic composition can be conventionally carried out by dispersing the fine particles of resin in a suitable carrier. A plastisol coating composition formed of fine particles of resin dispersed in plasticizer is particularly suitable. A solvent medium can be used although provision must be made to allow for the removal of the solvent prior to or while molding. It is essential to the invention that the coating be in a non-flowable state at the time of consolidation; otherwise, the coating will be forced from between the granules thereby resulting in loss of the desired effect. The flowability of the coating can be reduced by subjecting the granules to heat or the like to gell or partially solvate the resin thereby substantially reducing the mobility of the coating.

According to one embodiment of the invention, coated granules of plastic composition which have the appearance and handling qualities of dry granules can be obtained by dusting plastisol-coated granules with very fine particles or a powder of thermoplastic resin. This additional quantity of resin causes the plastisol coating to revert to a dry or non-flowable state. The dry coated granules can then be easily handled and even stored for subsequent use. The utilization of dry particles of resin has an additional advantage in that it makes possible a larger concentration of resin in the coating than can be obtained with plastisol compositions alone. This higher concentration of resin allows the formation of a product which is highly resistant to scratches and wear.

In each of these methods of coating, it is essential for the coating to contain as high a concentration of resin as possible. This is essential to give the desired effect since the coating forms the area simulating the matrix and will not be distinctive enough unless it is of substantial thickness between the granules.

In accordance with another embodiment of the invention, a similar and somewhat distinctive product can be obtained by coating the granules with a plasticizer and then dusting the plasticizer coated granules with fine particles of thermoplastic resin to produce a non-flowable coating. This procedure usually results in a ratio of resin to plasticizer substantially less than that obtained by using a plastisol coating and thereby limits the thickness of the coating which will remain on the molded granules as well as the hardness of the product. In this embodiment the coated granules should be dusted with as much resin as possible, usually about one to three times the amount of plasticizer; otherwise, the final product will be too soft for use as a covering subjected to appreciable wear.

Another embodiment of the invention involves the coating of the granules only on the portion visible in the surface of the product. This can be accomplished by coating the surface of a mold plate with a plastisol, depositing the granules on the coating and then heating and pressing the granules to form a sheet. The pressing under heat causes most of the coating to be forced between the granules giving the finished sheet its desired terrazzo appearance with the coating forming the matrix. Because the coating is liquid in certain instances, there is a tendency for it to be forced to the edge of the mold. This tendency can be overcome by the methods indicated above. The coating in the mold can be heated to partially solvate the resin and convert the composition to a non-flowable film. Alternately, additional resin can be added to the plastisol to substantially increase its viscosity. Utilizing this embodiment, the matrix around the granules does not extend completely through the thickness of the product. By the use of a thick coating, however, the matrix will penetrate for a substantial distance into the finished sheet.

Other features and advantages of the invention will be apparent from the following detailed description when read in conjunction with the drawings which are illustrative of one method of carrying out the invention and wherein.

The process of this invention is applicable to various types of plastic composition of the thermoplastic synthetic and natural resin types. Each type of resin requires its own particular processing conditions, depending on its softening point and molding and processing temperature. The invention finds particular usefulness in the manufacture of surface coverings of thermoplastic vinyl resin compositions. The vinyl resin composition type will be taken as typical in the description of certain embodiments of the invention which follow.

Figure 1:
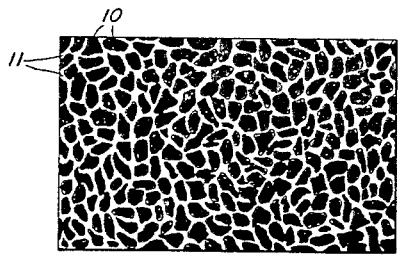
FIGURE 1 is a plan view of a plastic, flexible smooth surface covering which illustrates the effect obtained in accordance with the invention.
Figure 2:
FIGURE 2 is a cross-sectional view of the surface covering of FIGURE 1.
Figure 3:
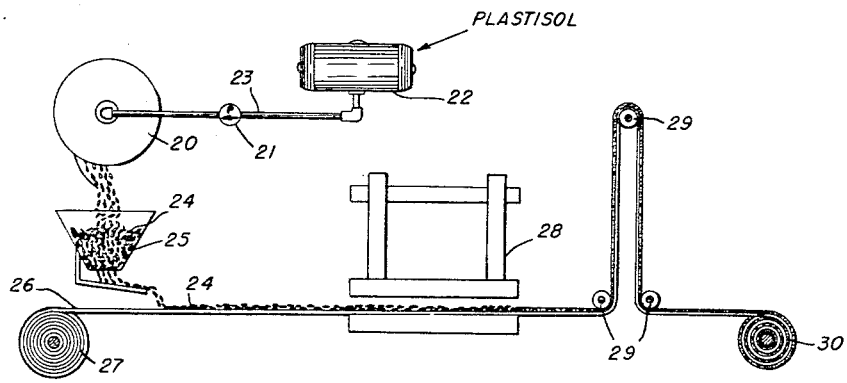
FIGURE 3 is a diagrammatic side elevational view which is illustrative of one type of apparatus which can be used in the practice of the invention.

The product produced in accordance with the invention is shown in FIGURES 1 and 2 and comprises plastic granules 10 formed into a smooth, uniform sheet and separated from each other by matrix 11 of resin and plasticizer which forms the coating on the granules. This product can be prepared, as illustrated in FIGURE 3, by charging granules of vinyl resin composition into a container 25 and agitating the granules while spraying with a liquid plastisol supplied from storage vessel 22 through a pipe 23 by pump 21. The agitation and spraying is continued until all the granules have a uniform coating of the desired thickness. The thickness of the coating is controlled by limiting the amount of plastisol supplied to the mixing container 22. A sufficient amount of powdered thermoplastic resin compatible with the granules is then dumped into the container 25 and the agitation continued until the coated granules have the appearance and handling characteristics of dry granules. The coated granules 24 are then dumped into a feeding means such as a vibrating feeder from which they are deposited uniformly on a backing web 26 supplied from roll 27. The depth of the coated granules 24 on the backing web 26 depends in large measure on the desired ultimate thickness of the sheet. A typical depth of the particles would be ¼ inch. The covered web is then fed into a hydraulic press 28 where heat and pressure is applied to the particles to consolidate and fuse them into a smooth, uniform sheet. The temperature and pressure applied to the coated granules will depend on the characteristics of the resinous component of the granules. When using a polyvinyl chloride resin, the pressing is carried out at about 275° F. to 375° F. at a pressure of about 200 to 1000 pounds per square inch. After pressing, the web is cooled by passing around cooling cans 29 and then wound on collecting roll 30. The product can be subjected to further treatment, such as planishing, embossing or similar operations if desired. A similar product can be produced by charging a conventional mold with the coated granules and then subjecting the mold to heat and pressure.

Figure 4:
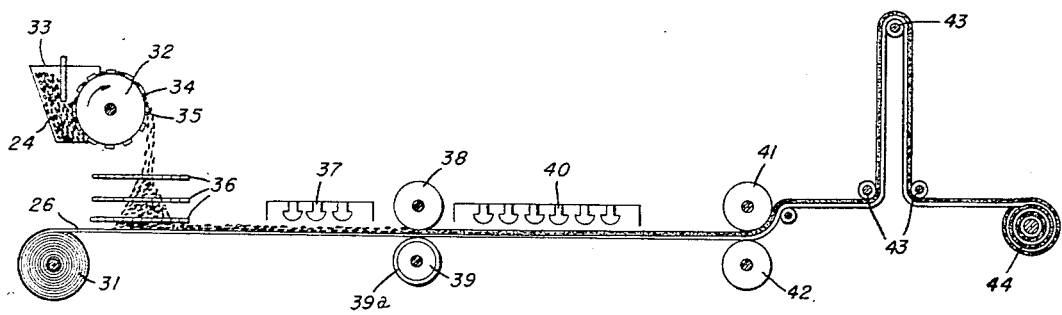
FIGURE 4 is a diagrammatic side elevational view which is illustrative of a second type of apparatus which can be used in the practice of the invention.

The product of the invention can also be produced by calendering if careful control is maintained to prevent the granules from becoming distorted. Substantial distortion of the granules will result in a loss of the decoration desired. One calendering procedure is shown in FIGURE 4. A backing web 26 is fed from a roll 31 and coated granules 24 of plastic composition prepared as described above are spread on the web from a feeding mechanism, generally indicated at 32. The feeding mechanism 32 comprises a feed hopper 33 for holding the coated granules 24, a feed wheel 34, having ribs 35 extending horizontally across its surface parallel to the axis of the roll to form slots between the ribs, and a series of screens 36 in vertical alignment for distributing the granules uniformly on the web 26. In operation, the feed wheel 34 with its associated ribs 35 revolves and the space between the ribs picks up a limited number of granules 24 from the hopper 33 carrying them in an upward direction through the path of travel of the roll and drops them on top of the vertically aligned screens. The granules 24 pass through the screens and are thereby uniformly distributed on the web. The covered web is then passed under a heating means 37, such as infra-red lamps which heat the granules to their fusion temperature and then between two calender rolls 38 and 39, which consolidate the granules together without substantially distorting their shape. The calender roll contacting the back of the web is preferably a roll having a rubber covering 39a. The web and consolidated granules can then be passed through a second heating means 40 to maintain their high temperature and then passed between a second pair of calender rolls 41 and 42 which impart a smooth finish to the surface of the plastic composition sheet. The sheet is thereafter cooled by passing over cooling cans 43 and wound on a collecting roll 44.

As mentioned hereinabove, any plastic composition which is capable of being formed into granules and molded with heat and pressure can be used in accordance with the invention. The composition usually contains about 15 to about 80% resin, about 5 to about 30% plasticizers and up to about 80% filler which includes pigments, and minor amounts of light and heat stabilizers. A particularly useful surface covering is made by utilizing a composition containing as its major resinous component a thermoplastic polyvinyl resin, Suitable polyvinyl compositions are disclosed, for example, in U.S. Patent No. 2,558,378, which issued on June 26, 1951. The polyvinyl resins are the most widely used resins in floor coverings and particularly polyvinyl chloride polymers and copolymers of polyvinyl chloride and polyvinyl acetate containing from about 80 to about 98% vinyl chloride. These resins are thermoplastic resins having a softening point above about 150° F. The vinyl chloride polymers can either be simply, unmixed homopolymers of vinyl chloride of polymers thereof in which the essential polymeric structure of polyvinyl chloride is interspersed at intervals with the residues of other ethylenically unsaturated compounds polymerized therewith. The essential proportions of the polymeric structure of polyvinyl chloride will be retained if not more than 40% of additional monomers are copolymerized therein. Suitable monomers include vinyl bromide, vinyl fluoride, vinyl acetate, vinyl chloroacetate, vinylbutyrate, other fatty acid vinyl esters, vinyl alkyl sulfonates, trichloroethylene and the like, vinyl ethers such as vinyl ethyl ether, vinyl isopropyl ether, vinyl chloroethyl ether and the like, cyclic unsaturated compounds such as styrene, mono and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylnitrile, diethyl maleate, diethyl fumarate and the like; vinylidene compounds such as vinylidene chloride, vinylidene bromide, vinylidene fluorochloride and the like; unsaturated hydrocarbons such as ethylene, propylene, isobutene and the like; alkyl compounds such as alkyl acetate, alkyl chloride, alkyl ethyl ether and the like; and conjugated and cross-conjugated ethylenically unsaturated compounds such as butadiene, isoprene, chloroprenes, 2,3-dimethylbutadiene-1,3; piperylene, divinyl ketone and the like. Copolymers of vinyl chloride with dibutyl maleate, ethyl acrylate, methyl acrylate, butyl acrylate, methyl ethyl acrylate and butylmethylacrylate, all containing substantially the same amount of combined vinyl chloride and having the same viscosity, also have been used. In addition, copolymers of vinyl chloride and acrylonitrile containing about 45% to about 80% vinyl chloride can be used, as well as copolymers of vinyl chloride and vinylidene chloride. Typical of other suitable resins are polyacrylonitrile, polymethylacrylates, hydrocarbon resins such as polybutylene and polyethylene and synthetic rubber such as polymers of butadiene with styrene and acrylonitrile.

The synthetic resinous material can be plasticized by any of a number of plasticizers or combinations of plasticizer, such as tricresyl phosphate, dioctyl phthalate, dicapryl phthalate, dibutyl phthalate, dibutyl sebacate, dibutoxyl ethyl phthalate, dibutoxyglycol phthalate, polyethyleneglycol di-2-ethyl hexoate, tributyl phosphate, butyl glycollate, polymeric butadiene acrylonitrile, chlorinated paraffin and the like. Particularly suitable plasticizers are linear polyester resin and plasticizer made by introducing epoxy groups into drying oils such as soy bean oil.

The plasticized synthetic resinous binder can be mixed with suitable fillers and pigments. Typical fillers are limestone, whiting, clay, pumice, silica flour, wood flour and asbestos. These fillers are normally added as very small particles below 80 microns. Various pigments can be used such as titanium dioxide, zinc oxide and various organic and inorganic colored pigments.

Minor amounts of stabilizers which are incorporated to reduce the effects of degradation by light and heat are also usually present in the composition. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like.

The composition also preferably includes heat stabilizers such as sulfides and sulfites of aluminum, silver, calcium, cadmium, magnesium, cerium, sodium, strontium and the like, glycerine, leucine, alanine o- and p-amino benzoic and sulfanilic acids, hexamethylene tetramine, weak acid radicals including oleates, ricinoleates, abietates, salicylates and the like.

It is desirable in certain instances to add a lubricant or release additive. The release additive should be fluid at the temperature at which the granules are heated without substantial vaporization. Waxy substances of both synthetic and natural origin can be used as release agent. Such naturally occurring waxes as vegetable waxes, including carnauba wax, cotton seed wax, montan wax, candelilla wax, flat wax, seaweed wax and the like; insect and animal waxes, such as beeswax, Chinese insect wax, spermaceti and the like; and petroleum waxes such as paraffin wax, are effective. Various synthetic waxes can also be used as the release additive in the invention. Waxes prepared by the polymerization of olefins such as ethylene, propylene, butylene and the like in the presence of catalysts such as silica, silica-alumina, molybdena and phosphoric acid are suitable. In addition, various high molecular weight polyethylene and polypropylene glycols are useful waxes. Fatty acids having from 12 to 30 carbon atoms and their derivatives have been found to be particularly outstanding in that they improve the flow characteristics of the composition under heat and pressure which imparts the required fluidity to the composition. Such acids as lauric, myristic, palmitic, stearic, behenic and the like, as well as their derivatives such as heavy metal salts, esters, amides and the like, are useful. Salts or soaps of heavy metals such as calcium, magnesium, barium, aluminum, zinc, lead, copper, cobalt and nickel with fatty acids of from 12 to 30 carbon atoms have waxy properties rendering them good release additives for use in the invention. In addition, esters of long chain fatty acids having from 12 to 30 carbon atoms with alcohols having from 6 to 30 carbon atoms are also useful. The esters can be based on such long chain fatty acids as tabulated above and such alcohols as hexyl alcohol, octyl alcohol, isooctyl alcohol, cetyl alcohol, arachyl alcohol, ceryl alcohol and the like. Thus effective esters can include isooctyl palmitate, cetyl myristate, duodecyl, stearate, octyl cerotinate, cetyl palmitate, hexy carnubate and the like. The higher molecular weight esters have similar physical properties to waxes, and in many cases the major ingredient in a natural occurring wax is a high molecular weight ester as disclosed above.

The release additive is present in the composition in an amount sufficient to give good release of the composition from a hot platen. Usually, amounts of about 0.2 to 2.5% are effective.

The plastic composition granules are conventionally prepared by blending resin, plasticzer, filler pigments and stabilizers together at temperatures substantially above the softening point of the resin. The mixed composition is then sheeted by passing between calender rolls, followed by a scratching or breaking operation to convert the sheet into irregular granules. When using polyvinyl chloride resin, these operations are carried out at between 290° F. and 375° F. The granules are preferably within the range of about 0.18 to about 1.0 inch in diameter. The thickness of the granules will depend in large part on the thickness desired in the resultant sheet. A thickness of about 0.01 to about 0.024 inch is suitable for consolidation into a sheet of about 0.03 inch. A most attractive product is obtained by using granules of irregular size formed initially from a sheet having a jaspe or marbleized decoration.

The plastisol coating composition is prepared by mixing together fine particles of thermoplastic resin and plasticizer to solvate the resin thereby forming a flowable viscous composition. Any suitable plasticizer can be used which is compatible with both the thermoplastic resin and the plastic composition which makes up the granules. The resin in the plastisol coating composition does not have to be the same as that used in production of the plastic granules. The plastisol resin is preferably a polyvinyl resin of the type hereinabove listed. The dispersion grade resins are the most desirable and they usually have a viscosity within the range of about 0.17 to about 0.35 as measured in a solution of 0.2 gram of resin in 100 milliliters of nitrobenzene at 20° C. These resins usually have a particle size ranging from 0.02 to about 2 microns. The ratio of plasticizer to resin in the plastisol can be varied to produce the viscosity desired for coating. A ratio of about 1:1 to 1:4 is highly desirable. The concentration of resin is preferably as high as possible. A ratio of granules of plastic composition to plastisol coating of 1,000 parts of granules to about 25 to about 100 parts of plastisol has been found to give sufficient uniform coating of the granules.

The plastisol coating on the granules can be converted to a dry, or non-flowable, state by dusting the coated granules with fine particles of dry thermoplastic resin. It is possible by this method to raise the ratio of resin to plasticizer to about 1 to 2 parts higher than that which can normally be obtained with a conventional plastisol composition. This high ratio of resin enables the forming of a product having a thick coating of resin on the granules and thereby greatly increases the wear resistance of the product. The particles of thermoplastic resin are preferably as fine as possible thereby presenting the largest surface area to enable them to absorb the maximum amount of the plastisol coating. A particle size of less than 2 microns is preferred. Generally when the particle range is below about 0.02 micron, they are too difficult to handle.

Particularly striking color effects can be obtained by adding pigments to the plastisol and/or dusting resin to produce a color which contrasts with the color of the granules. The only limitation on pigmentation is that the coating on the granules of plastic composition generally should appear to have the same coloration as the granules. This prevents the product from changing color as the coating is worn off. This can be accomplished by using a coating which is only slightly tinted. Such a coating will be transparent on the granules and, because of the depth of the coating material between the granules, it will have a distinct coloration. Other pleasing effects can be obtained by using metallic pigments such as flakes of colored aluminum in the plastisol. A static conductive floor covering can be prepared by incorporating carbon black or the like in the plastisol or granules.

The backing sheet on which the granules of plastic composition prepared as described above are pressed can be a sheet which is subsequently stripped from the formed plastic sheet, or it can become an integral part of the final product. The conventional procedure is to use a fibrous backing sheet which becomes part of the product. Numerous fibrous materials can be used in preparing a fibrous backing sheet for use in the invention. The fibrous material used is normally cellulose in origin although other fibers can be used, including those of animal and mineral origin. The sources of cellulose can include cotton or other rag stock, wood pulp, including both ground wood and chemical wood pulp, paper, boxes or mixtures thereof in any proportions. In addition, fillers such as wood flour can be used. An aqueous slurry of fibers is sheeted on a Fourdrinier or cylinder paper machine and the sheet dried.

In order that the fibrous sheet have sufficient strength for use as a surface covering material, it is conventionally impregnated with suitable resinous impregnants. The conventional asphalt saturants used in preparing backing sheets in the manufacture of linoleum and other smooth surface floor coverings are not normally satisfactory. The high temperatures encountered in the pressing step and subsequent fusion cause conventional asphalt saturants to exude from the sheet resulting in damage to the press. Fibrous sheets impregnated with thermoplastic or elastomeric resins are particularly effective in the invention. Suitable resins include vinyl resins, such as polyvinyl chloride, polyvinyl acetate, polymerized vinylidene chloride, mixtures of these with each other, copolymers with each other and with other monomers copolymerizable therewith, polymerized acrylic and methylacrylic acids and their polymerized derivatives, polyethylene, polystyrene, butadiene-styrene copolymer, butadiene-acrylonitrile copolymer, natural rubber, polymerized chloroprene and the like. Polymers and copolymers of vinyl acetate are particularly effective. Fibrous sheets impregnated with these resins impart good strength and flexibility to the final product and permit processing at elevated temperatures without exudation.

Such thermoplastic and elastomeric resins can be incorporated most conveniently into a fibrous sheet by adding an emulsion of the resin to the suspension of fibers in water prior to sheet formation. The resin is then precipitated by the addition of well-known precipitating agents, such as alum. In this way, the resin forms agglomerates upon the fibers serving to partially bond them together.

A sheet with improved cutting properties and water resistance can be produced by passing the fibrous sheet formed as described through a bath of thermoplastic resinous material which has a softening point of between about 100° F. and 160° F., thereby impregnating the sheet. Resins derived from petroleum are particularly effective for this purpose. Particularly effective fibrous sheets so prepared will contain from about 3 to about 15% of the thermoplastic or elastomeric resin added prior to sheet formation and from about 10 to about 45% thermoplastic resin added by impregnation. Such a felt imparts excellent cutting properties, flexibility and strength to the finished product.

In order that the decorative composition will adhere satisfactorily to the fibrous backing sheet after being pressed thereon, the sheet is normally coated with an adhesive prior to the deposit of granules. The presence of an adhesive coating aids also in keeping the granules on the sheet during their deposition. Adhesives in the form of emulsions in water are particularly effective, as for example, an emulsion of butadiene-acrylonitrile rubber and hard pine resin, such as that sold by Hercules Powder Company under the trademark "Vinsol." The adhesive emulsion is applied to the surface of the backing sheet to which the composition is to be bonded and then the sheet is heated to evaporate the water in the emulsion. Methods for preparing such a sheet are disclosed in U.S. Patent No. 2,757,711 which issued on Aug. 7, 1956, to R. K. Petry et al. Although adhesives available in the form of emulsions are preferred, solvent-based adhesives can also be used. In some cases when a felt backing is impregnated with a resin which is compatible with the composition used for preparing the granules, no adhesive is required.

The following examples are given for purposes of illustration:

Example 1

The following composition was mixed at 350° F., followed by sheeting and scratching to produce, small, uniform granules of about ¼ to ½ inch in diameter and having a thickness of 15 to 30 mils:

|  | Percent |
|---|---|
| Resin (copolymer of 97% vinyl chloride and 3% vinyl acetate) | 27 |
| Plasticizer (dioctyl phthalate) | 14 |
| Filler (CaCO$_3$) | 54 |
| Pigments | 3 |
| Stabilizer | 2 |

A plastisol of the following formation was prepared:

|  | Percent |
|---|---|
| Polyvinyl chloride | 58 |
| Epoxidized polyester | 3 |
| Alkyd modified rosin | 15 |
| Mixed diisooctyl and di-n-octyl phthalate | 22 |
| Pigments (TiO$_2$) | 2 |

One thousand twenty-grams of granules having a black pigmentation were charged into a mixing vessel and 120 parts of the plastisol composition having a white pigmentation were sprayed on the granules while tumbling until the granules were thoroughly coated with plastisol. The coated granules were then heated for fifteen minutes at 300° F. to substantially raise the viscosity of the plastisol coating. The compositions was then spread uniformly in a press and subjected to pressing for ten minutes with 95 pounds of steam and 250 pounds per square inch of pressure. The press was then allowed to cool while increasing the pressure to 300 pounds per square inch. The finished product had a thin line of white plastisol resembling a matrix surrounding each of the black pieces giving the product a terrazzo appearance.

Example 2

The procedure of Example 1 was followed using the following plastisol composition:

|  | Percent |
|---|---|
| Polyvinyl chloride | 42 |
| Copolymer of vinyl chloride and vinylidene chloride | 14.6 |
| Epoxidized polyester | 3.7 |
| Alkyd modified rosin | 34 |
| Mixed diisooctyl and di-ni-octyldecyl phthalate | 3.7 |
| Stabilizer | 2.0 |

One thousand grams of black and white granules were coated, as described in Example 1, with 75 parts of the above plastisol composition. Forty-five grams of fine particles of polyvinyl chloride resin were added and tumbling continued until the coated pieces were dry. The composition was then pressed in a mold for 33 minutes at 1000 p.s.i. pressure. The product had a transparent matrix surrounding each granule.

Example 3

One thousand grams of granules prepared as in Example 1 were coated with 50 grams of dioctyl phthalate. The coated granules were then mixed with 100 grams of fine particles of polyvinyl chloride. The composition was then subject to a molding operation at 93 pounds of steam pressure and 250 pounds per square inch of pressure for ten minutes. Before removing from the mold, the composition was allowed to cool for 2 minutes with slight additional pressure. The product had a matrix surrounding each granule and unusual design characteristics.

Any departure from the above description which conforms to the present invention is intended to be included within the scope of the claims.

I claim:

1. A process for producing a decorative plastic composition sheet suitable for use as a surface covering formed of granules of pigmented vinyl composition surrounded by an area of contrasting coloration which comprises coating small granules of pigmented vinyl plastic composition with a liquid plasticizer, distributing fine particles of vinyl resin on the surface of the coated granules to produce a non-flowable coating and molding the coated granules into a smooth uniform sheet by the application of heat and pressure.

2. A process for producing a smooth decorative plastic composition sheet suitable for use as a surface covering formed of granules of pigmented plastic composition comprising thermoplastic resin, plasticizer, stabilizer and filler, wherein each individual granule is separated from each other granule by a layer consisting of plasticized thermoplastic resin pigmented to have a color distinct from said granules, which comprises coating said granules of said plastic composition with a liquid plastisol comprising vinyl resin and plasticizer, applying fine particles of thermoplastic resin to the surface of the coated granules to produce a non-flowable coating and molding the particle coated granules into a smooth, uniform sheet by the application of heat and pressure.

3. A process for producing a smooth decorative plastic composition sheet suitable for use as a surface covering formed of granules of pigmented plastic composition wherein each individual granule is separated from each other granule by a layer of plasticized polyvinyl chloride resin having a distinct coloration, which comprises coating granules of polyvinyl chloride resin composition having a diameter ranging from about 0.18 to about 1.0 inch and a thickness ranging from about 0.01 to about 0.03 inch with a liquid plastisol comprising polyvinyl chloride resin and plasticizer, applying fine particles of polyvinyl resin to the surface of the coated granules of plastic composition in sufficient quantity to convert said coating to a non-flowable state and then molding the coated granules into a smooth, uniform sheet by the application of heat and pressure.

4. A process for producing a decorative plastic composition sheet suitable for use as a surface covering formed of granules of pigmented composition surrounded by an area of contrasting coloration which comprises coating small pigmented granules of vinyl plastic composition with a liquid plastisol of vinyl resin and plasticizer having a coloration contrasting with that of said granules, applying fine particles of vinyl resin to the surface of the coated granules to increase the ratio of resin to plasticizer in said coating to produce a non-flowable coating and molding the coated granules into a smooth uniform sheet by the application of heat and pressure.

5. A process for producing a decorative plastic composition sheet suitable for use as a surface covering formed of granules of pigmented composition material surrounded by an area of contrasting coloration, which comprises coating small pigmented granules of vinyl plastic composition comprising from 17 to 55% vinyl resin, 8 to 25% plasticizer and 25 to 75% filler with about 2.5% to about 10% by weight of a liquid plastisol comprising 1 to 4 parts polyvinyl resin and 1 part plasticizer pigmented to contrast with said granules, uniformly applying fine particles of polyvinyl resin to the surface of the coated granules of plastic composition to increase the ratio of resin to plasticizer to between 1 to 2 parts more resin to produce a non-flowable coating and molding the coated granules into a smooth, uniform sheet by the application of heat and pressure.

6. A process for producing a decorative plastic composition sheet suitable for use as a surface covering formed of granules of composition material surrounded by an area of contrasting coloration, which comprises coating small pigmented granules of vinyl plastic composition comprising from 17 to 55% vinyl resin, 8 to 25% plasticizer and 25 to 75% filler with about 2.5% to about 10% by weight of a liquid plastisol comprising 1 to 4 parts polyvinyl resin and 1 part plasticizer pigmented to contrast with said granules, uniformly applying fine particles of polyvinyl resin ranging in size from between 2 microns to about 0.02 micron in diameter to the surface of the coated granules of plastic composition to increase the ratio of resin to plasticizer to produce a non-flowable coating and molding the coated granules into a smooth, uniform sheet by the application of heat and pressure.

7. A process for producing a decorative plastic composition sheet suitable for use as a surface covering formed of granules of pigmented plastic composition wherein each granule is surrounded by a distinct area of contrasting coloration, which comprises coating pigmented granules of vinyl plastic composition comprising from 17 to 55% of a copolymer of vinyl chloride and vinyl acetate, 8 to 25% plasticizer, and 25 to 75% filler with a liquid plastisol comprising 50 to 80% polyvinyl resin and 20 to 50% plasticizer, applying 100 to 200% by weight, based on the weight of the resin in the plastisol, of fine particles of polyvinyl resin to the surface of the coated granules to produce a non-flowable coating and then molding the coated granules into a smooth, uniform sheet by the application of heat and pressure.

References Cited

UNITED STATES PATENTS

| | | | |
|---|---|---|---|
| 1,486,208 | 3/1924 | Weber | 18—48.8 |
| 1,583,545 | 5/1926 | Frood et al. | 18—48.8 |
| 3,038,828 | 6/1962 | Yakubik | 161—119 |
| 3,049,761 | 8/1962 | Yakubik | 264—73 |

FOREIGN PATENTS

| | | |
|---|---|---|
| 603,526 | 5/1898 | France. |
| 619,037 | 2/1899 | France. |

JACOB H. STEINBERG, *Primary Examiner.*

CARL F. KRAFFT, ALEXANDER WYMAN, EARL M. BERGERT, *Examiners.*

M. Q. TATLOW, R. J. CARLSON,
*Assistant Examiners.*